United States Patent [19]

Klendworth

[11] Patent Number: 4,788,171

[45] Date of Patent: Nov. 29, 1988

[54] PHOSPHATED CALCINED ALUMINA

[75] Inventor: Douglas D. Klendworth, Bartlesville, Okla.

[73] Assignee: Philips Petroleum Company, Bartlesville, Okla.

[21] Appl. No.: 10,258

[22] Filed: Feb. 2, 1987

[51] Int. Cl.[4] .............................. C08F 4/62; C08F 4/24; C08F 4/02; B01J 27/188
[52] U.S. Cl. ..................................... 502/155; 502/208; 502/210; 526/106; 526/134; 526/156
[58] Field of Search ................ 502/210, 208, 204, 202, 502/155

[56] References Cited

U.S. PATENT DOCUMENTS

| | | | |
|---|---|---|---|
| 4,397,765 | 5/1982 | McDaniel | 526/134 |
| 4,547,479 | 10/1985 | Johnson et al. | 502/210 |
| 4,588,706 | 5/1986 | Kukes et al. | 502/210 |

Primary Examiner—Paul E. Konopka
Attorney, Agent, or Firm—Williams, Phillips and Umphlett

[57] ABSTRACT

Alumina is calcined and thereafter given a phosphating treatment. The resulting composition is particularly suitable for a support for a transition metal compound such as chromium oxide to provide an olefin polymerization catalyst. The resulting catalyst is capable of producing polymer at unusually high productivity rates and also gives the ability to produce high melt flow polymer.

16 Claims, No Drawings

PHOSPHATED CALCINED ALUMINA

BACKGROUND OF THE INVENTION

This invention relates to phosphated alumina.

Supported catalysts such as chromium oxide on silica can be used to prepare olefin polymers in a hydrocarbon solution to give a product having excellent characteristics from many standpoints. Supported transition metal oxide catalysts can also be used to prepare olefin polymers in a slurry system, wherein the polymer is produced in the form of small particles of solid material suspended in a diluent. This process, frequently referred to as a particle-form process, has the advantage of being less complex.

Recently, it has been discovered that aluminum phosphate can be prepared in a manner which provides an outstanding support for olefin polymerization catalysts. However, the aluminum phosphate must be prepared in a fairly complex manner in order to preserve the pore structure and therefore, it is relatively expensive. It is known that alumina, which is quite inexpensive, can be used as a support for chromium catalysts. However, in fact, alumina does not generally give a very satisfactory support.

McDaniel, U.S. Pat. No. 4,397,765 (Aug. 9, 1983), discloses a quite satisfactory support made by phosphating alumina. This support is inexpensive to prepare and gives excellent results compared with alumina. It does, however, fall short of giving a productivity as high as the more expensive aluminum phosphate. Also, certain properties such as melt flow are not as good with aluminum phosphate as the support.

SUMMARY OF THE INVENTION

It is an object of this invention to provide an improved alumina;

It is a further object of this invention to provide an alumina supported chromium catalyst which is capable of giving high productivity and high melt index;

It is yet a further object of this invention to provide an inexpensive support capable of giving productivity values as good as those obtained with the more expensive aluminum phosphate; and It is still yet a further object of this invention to provide an improved olefin polymerization process.

In accordance with this invention, alumina is calcined and thereafter subjected to a phosphating treatment.

DESCRIPTION OF THE PREFERRED EMBODIMENTS

The starting alumina can be any alumina convertible at least in part on thermal dehydroxylation to gamma alumina. Preferably, it is boehmite alumina. It may be desirable in some instances to form the alumina hydrogel in the presence of 1 to 30 mole percent of a boron compound such as boric acid, based on the moles of alumina. The alumina can also contain minor amounts of other ingredients (such as 1-10 weight percent silica) which do not adversely affect the quality of the final catalyst, but is generally essentially pure alumina.

The starting alumina can be made in any manner well known in the art, for instance, by reacting sodium aluminate, which is basic, with aluminum sulfate, which is acidic, by neutralizing an aluminum salt with a base such as ammonia or ammonium hydroxide, or by flame hydrolysis.

The calcined and phosphated alumina of this invention has wide applicability in utilities where refractory catalyst supports are used. The calcined and phosphated alumina of this invention can also be used in other utilities known for alumina such as fillers. It has also been found to be an excellent isomerization catalyst without any other catalytic ingredient being deposited thereon. However, it is of primary utility as a chromium oxide catalyst support for olefin polymerization.

It has been found from work with aluminum phosphate, that the best polymer properties, such as high melt index, high density and good environmental stress crack resistance (ESCR) are obtained using a high P/Al ratio, i.e., about 0.8. However, surface area and pore volume are optimum at a lower P/Al ratio, i.e. about 0.4 because of sintering at the higher ratios. This invention makes it possible to have the good physical stability of a low P/Al ratio support since the bulk of the support is pure alumina and still have the good catalytic effect of the high ratio because of the high content of phosphorus on the surface. In addition, the invention allows achieving a high productivity with a relatively inexpensive alumina support.

The invention takes advantage of the fact that some properties, such as surface area, are favored by high alumina content whereas others, such as melt index potential, are favored by phosphate content. By imparting a phosphate layer on the surface of alumina, it is possible to take advantage of both trends, and by calcining prior to the phosphating, it is possible for reasons which are not fully understood, to drastically improve the activity and melt index potential of the catalyst.

Calcining of the alumina prior to the phosphate treatment, i.e., calcining of unphosphated or phosphorus-free alumina, is carried out at a temperature within the range of 450°-900° C., preferably within the range of 600°-800° C., for a time of 1 minute to 48 hours, preferably 0.5 to 10 hours. The calcining can be carried out in air or in an inert gas such as nitrogen or helium, the principal purpose of the atmosphere being to sweep away moisture. The result of this calcining is to give an alumina defined as $Al_2O_3 \cdot nH_2O$ where n is from 0 to 0.6, said alumina having a surface area within the range of 100 to 500 m$^2$/g., generally 250-400 m$^2$/g. Such alumina is generally referred to as gamma alumina although some other forms such as chi alumina and/or eta alumina may also be present. The lower limit of at least 450° C. is critical to the invention since this is the minimum temperature at which the starting alumina (where n is generally greater than 1) can be converted to gamma alumina. The upper recitation of 900° C. is also essential if the purpose is to produce a catalyst support since at temperatures above 900° C., gamma alumina is converted to the delta, and finally, the alpha form where the surface area and pore volume are progressively reduced.

The terms "phosphate treatment" and "phosphating" are meant to refer broadly to the phosphorus treatment and not to indicate that the treating agent is a phosphate; although, of course, on activation the phosphorus will be converted to a phosphate.

Subsequent to the calcining, the alumina is subjected to the phosphorus treatment. The phosphating agent can be any source of phosphorus such as phosphorus-containing ions, preferably orthophosphoric acid. Alternatively, an orthophosphate such as monoammonium dihydrogen phosphate or diammonium hydrogen phosphate or even a metal phosphate can be used. Alternatively, a phosphorus compound which can be vaporized, such as $POCl_3$ (phosphoryl chloride) or $PCl_3$ (phosphorus trichloride) can be used. Other suitable sources of phosphorus include polyphosphoric acid and organic phosphorus compounds such as phosphonium salts. The phosphating treatment is preferably carried out by forming a slurry of the calcined alumina xerogel and the source of phosphorus, such as orthophosphoric acid, in a diluent such as water. Also included are compounds which are converted to phosphates during calcining. Other suitable phosphorus sources include phosphorus containing organic compounds such as phosphine derivatives. Phosphite ions such as phosphorous acid or $NH_4H_2PO_3$ are also suitable sources of the phosphorus.

The phosphating agent may also be incorporated in an organic water miscible liquid to treat the alumina xerogel. Thus, it may be in an aqueous or organic solution or it may be a vapor.

The phosphating agent is preferably used in an amount to react with the alumina surface to give a P/Al atom ratio of the reaction product on the surface of from 0.2:1 to 2:1, preferably from 0.6:1 to 0.9:1. In practice, however, it is possible to use as much phosphating agent as desired with the excess simply being washed off after the phosphating treatment is complete. The phosphating treatment is generally carried out at a temperature of 15° C. to 500° C., preferably room temperature to the boiling point of the solvent if a solution of a phosphorus compound is used, or about 200° C. if a vapor is used. Times ranging from 1 minute to 2 hours, preferably 2 minutes to 30 minutes are suitable.

Viewed another way, the phosphorus component is added in an amount to give 0.1 to 20, preferably 1 to 10 mole percent of the phosphorus compound incorporated based on the total moles of alumina. Based on surface area, the phosphorus compound from the phosphating agent is preferably present in an amount sufficient to give about 0.005 to 1, preferably 0.01 to 0.5 mg $P/m^2$ of alumina surface as measured by BET nitrogen adsorption.

Based on the chromium in compositions containing chromium, the phosphorus component is utilized in an amount to give about 1 to 5 atom percent phosphorus incorporated, which would be 1 to 5 atoms of phosphorus per atom of chromium, particularly when the preferred 1 weight percent chromium based on the weight of alumina-containing support is used. Generally, the ratio of atoms of phosphorus per atom of transition metal, such as chromium, will be in the range of 0.1 to 20, preferably 1 to 10.

As previously set out, it is essential to the invention that the alumina be calcined prior to phosphating. When the purpose is to form a supported transition metal catalyst, the transition metal component, such as a chromium compound, is generally added after the phosphating treatment, although it can be added along with the phosphorus in the phosphating treatment, or it can be present in the alumina prior to calcining. In any event, the calcined and thereafter phosphated alumina, now containing the transition metal component, is finally given an activation step in a conventional manner to activate the catalyst.

The chromium compound can be any compound in, or convertible to, the hexavalent state. The supported chromium catalysts contain the chromium in an amount generally within the range of 0.001 to 10, preferably 0.1 to 5, more preferably about 1 weight percent, based on the weight of the dried phosphated alumina support.

Catalyst concentrations can be such that the supported catalyst content ranges from 0.001 to about 1 weight percent based on the weight of the reactor contents.

The chromium compound can be incorporated as known in the art. For instance, a hydrocarbon solution of a material such as tertiary butyl chromate can be used to impregnate the activated catalyst. Preferably, an aqueous solution of a chromium compound such as $CrO_3$ (chromium trioxide), chromium acetate, chromium nitrate or chromium sulfate, can be added to the calcined support prior to activation. Most preferably, however, a mixture of the chromium component and the phosphorus component are combined with the calcined alumina, for instance, by using an alcoholic solution of phosphoric acid and chromium acetate (or other chromium compounds soluble in an alcoholic solution of phosphoric acid). Other suitable, but less preferred, transition metal compounds are vanadium and titanium compounds.

Alternatively, the support can be activated without a transition metal component being present, and thereafter, a chromium component such as an organo-chromium compound, chromocene, for instance, can be anhydrously impregnated onto the support and the solvent gently removed to give an active catalyst.

The activation of the chromium-containing catalyst can be carried out at a lower temperature than is generally required for activating silica based chromium catalysts. Temperatures of 150° to 800° C., preferably 300°-800° C., more preferably 300°-600° C., are suitable. The activating ambient can be any oxidizing ambient but for reasons of convenience is generally air. Times of 1 minute to 48 hours, preferably 0.5 to 10 hours, are suitable.

The supported chromium on phosphated alumina catalysts of this invention can be subjected to reduction and then reoxidation as disclosed in McDaniel, U.S. Pat. No. 4,182,815 (Jan. 8, 1980), disclosure of which is hereby incorporated by reference, if desired.

The supported chromium catalysts of this invention are preferably used in conjunction with a cocatalyst. Suitable cocatalysts include aluminum and boron alkyls. The most preferred boron compounds are trihydrocarbyl boron compounds, particularly tri-n-butylborane, tripropylborane, and triethylborane (TEB). Other suitable boron compounds include trialkyl boron compounds broadly, particularly those having alkyl groups of 1 to 12 carbon atoms, preferably 2 to 5 carbon atoms, triaryl boron compounds such as triphenylborane, boron alkoxides such as $B(C_2H_5)_2OC_2H_5$ and halogenated alkyl boron compounds such as $BC_2H_5Cl_2$. Suitable aluminum alkyls include $R_3Al$, $R_2AlX$ and $RAlX_2$ compounds where R is a 1 to 12 carbon atom hydrocarbyl radical and X is a halogen, preferably chlorine. Triethylaluminum and diethylaluminum chloride are particularly suitable.

The cocatalyst is used in an amount within the range of about 0.1 to 25, preferably 0.25 to 5 parts per million by weight based on the weight of the solvent or diluent in systems employing a solvent or diluent and based on the weight of the total reactor contents in systems not employing a solvent or diluent. Based on the chromium, they are used in an amount so as to give from 0.05 to 5, preferably 0.05 to 3 times as much boron by weight as chromium by weight. Based on atoms of boron per atom of chromium, the amount of cocatalyst used will give about 0.5 to about 14, preferably about 1.5 to about 10 atoms of boron (or aluminum) per atom of chromium. The boron cocatalysts give higher density polymer than aluminum cocatalysts or catalyst systems with no cocatalyst.

The cocatalyst can be either premixed with the catalyst or introduced into the reactor as a separate stream, the latter being the preferred procedure.

Of course, the final catalyst can be used with, or contain, other ingredients which do not adversely affect its performance, as for example other cocatalysts, antistatic aids in the polymerization zone and other conventional ingredients.

The supported catalyst of this invention can be used to polymerize at least one mono-1-olefin containing 2 to 8 carbon atoms per molecule, preferably ethylene, propylene, 1-butene, 1-pentene, 1-hexene and 1-octene. The invention is of particular applicability in producing ethylene homopolymers and copolymers from mixtures of ethylene and 0.5 to 20 mole percent one or more comonomers selected from 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Ethylene copolymers preferably constitute at least about 90, preferably 97 to 99.6 weight percent polymerized ethylene units. Propylene, 1-butene, 1-pentene, 1-hexene and 1-octene are especially preferred comonomers for use with ethylene.

The presence of comonomer has a tendency to increase melt flow more than would be expected. Hence, the use of only a small amount of comonomer, say 0.001 to 0.3, preferably 0.01 to 0.1 mole percent in the feed can be used to give a polymer which is essentially a homopolymer but which has increased melt flow.

The polymers can be prepared from the catalyst of this invention by solution polymerization, slurry polymerization, and gas phase polymerization techniques, using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. The catalyst of this invention can be used to produce ethylene polymers in a particle form process as disclosed in U.S. Pat. No. 3,624,063 which issued Nov. 30, 1971 to Witt, the disclosure of which is hereby incorporated by reference.

The supported catalysts of this invention are particularly suitable for use in slurry polymerizations. The slurry process is generally carried out in an inert diluent (medium) such as a paraffin, cycloparaffin or aromatic hydrocarbon. For predominantly ethylene polymers, a temperature of about 66°–110° C. is employed. Pressures in the particle form process can vary from about 110 to about 700 psia (0.76–4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form.

Generally, in slurry polymerization of ethylene homopolymer and predominantly ethylene copolymer systems, the feasible temperature range is 200°–230° F. (93°–110° C.), and the commercial systems are run as close to the maximum as possible, i.e., 225° F.±5° F. (107° C.±3° C.), in order to obtain the highest possible melt index without the polymer going into solution. The catalyst of this invention allows running at the low end of this range, i.e., 205° F.±5° F. (96° C.±3° C.), in systems normally employing 225° F. (107° C.). The lower temperature gives a relatively higher monomer partial pressure, thus giving higher activity.

When hydrogen is used in the prior art, it is generally used at pressures up to 120 psia (0.8 MPa), preferably within the range of 20 to 70 psia (0.01 to 0.48 MPa). Similar amounts can be used in accordance with this invention although smaller amounts are sometimes preferred because of the sensitivity of this catalyst system to the effects of hydrogen.

Each run in the following Examples I and II was conducted in a clean, dry, air-free, stirred, stainless steel reactor of about a 2-liter capacity. About 600 grams of isobutane was used in each run as diluent with a catalyst charge ranging from about 0.08 to about 0.1 grams. The reactor and its contents were heated to the desired operating temperature, ethylene was pressured in to give about 565 psia (3.9 MPa), and the run was started immediately as the catalysts, unlike the corresponding chromium oxide on silica catalysts, do not have an induction period. Ethylene pressure was maintained during the run by supplying additional ethylene as required from a reservoir.

Each run was terminated by stopping the ethylene flow and venting the gaseous reactor contents to a flare line for disposal. The polymer was recovered, dried and weighed to determine catalyst productivity which is expressed in terms of grams polyethylene per gram catalyst. TEB stands for triethylborane.

EXAMPLE I

In this example, the aluminas tested were spray-dried aluminas having a boehmite structure. These aluminas are sold by Ketjen Catalysts, a division of Akzo Chemie, under the trademark Ketjen G or Ketjen L (which has about 5 weight percent silica). The invention runs were calcined at 600°–700° C. in air before being given a phosphating treatment. This calcination dehydroxylates the alumina converting it from the boehmite structure to the gamma structure. The phosphating treatment was carried out by impregnating the alumina with an alcoholic solution of phosphoric acid and chromium acetate. An amount of alcoholic solution was used which was just sufficient to impart incipient wetness to the support, this generally being about 2.5 cc/gram of support.

The phosphorus to aluminum ratio of the catalyst was adjusted by varying the amount of phosphoric acid used. Generally, 0.5 to 3 grams/40 cc of alcohol was used. Similarly, chromium acetate was used in an amount sufficient to give 1 weight percent chromium on the support. The control runs were given the same phosphating treatment but with no calcining before the treatment with the alcoholic solution of phosphoric acid and chromium acetate. In both the invention and control runs, the catalyst was activated in air at 700° C. prior to use in the polymerizations. The polymerizations were all carried out with 8 parts per million TEB at 95° C. and 550 psi (565 psia) ethylene pressure. Reactions were carried out in 1 liter (600 grams) of isobutane for 30 minutes. The results are shown hereinbelow in Tables IA and IB.

TABLE IA

KETJEN G

| | Calcined* | | | | Uncalcined** | | | |
|---|---|---|---|---|---|---|---|---|
| Run | P/Al[1] | SA[2] | Prod[3] | HLMI[4] | Control | P/Al | SA | Prod | HLMI |
| 1 | 0.1029 | 253 | 4209 | 6.7 | 1 | 0.1070 | 280 | 1213 | 0 |
| 2 | 0.0995 | 218 | 3108 | 1.45 | 2 | 0.1347 | 255 | 1314 | 0 |
| 3 | 0.1582 | 186 | 894 | 6.9 | 3 | 0.1790 | 222 | 1265 | 0 |
| 4 | 0.1776 | 197 | 2824 | 18.2 | 4 | 0.2125 | 198 | 1110 | 0 |
| 5 | 0.1907 | 191 | 2890 | 15.6 | | | | | |

*Sequence: Calcine; Impregnate with P/Cr; Activate.
**Sequence: Impregnate with P/Cr; Activate.
[1] P/Al as used herein refers to the atom ratio of phosphorus to aluminum.
[2] SA as used herein refers to the surface area in $m^2/g$ as measured by BET $N_2$ sorption.
[3] Prod as used herein means the productivity in grams polymer per gram catalyst per 30 minutes.
[4] HLMI is the melt flow in grams per 10 minutes as measured by ASTM D 1238 Condition F (190/21,601).

TABLE IB

KETJEN L
The procedure reported herein differs from that reported in Table IA above only in the use of a different grade of alumina.

| | Calcined* | | | | Uncalcined** | | | |
|---|---|---|---|---|---|---|---|---|
| Run | P/Al | SA | Prod | HLMI | Control | P/Al | SA | Prod | HLMI |
| 6 | 0.1092 | 303 | 2756 | 2.4 | 5 | 0.1189 | 353 | 1667 | 0 |
| 7 | 0.1413 | 264 | 2953 | 2.7 | 6 | 0.1415 | 318 | 1796 | 0.2 |
| 8 | 0.1741 | 237 | 2257 | 9.4 | 7 | 0.1860 | 288 | 2116 | 0.7 |
| 9 | 0.2122 | 222 | 1740 | 7.7 | 8 | 0.2397 | 248 | 1853 | 4.1 |
| 10 | 0.2378 | 202 | — | — | | | | | |

*Sequence: Calcine; Impregnate with P/Cr; Activate.
**Sequence: Impregnate with P/Cr; Activate.

As the results of Example I show, at a similar phosphorus to alumina ratio, the calcined invention runs have the dual advantage of having much higher productivity and higher melt flow. Run 3 of Table IA is a nonrepresentative run with the productivity being low because of contamination. This was confirmed by running a known catalyst which also gave an atypic result.

EXAMPLE II

In this example, the invention runs were carried out exactly as in Example I. The control runs differ only in that the alumina was calcined between the phosphorus treatment and the addition of the chromium. Thus, for the control runs, the sequence was to utilize the alumina as received and impregnate same with an alcoholic solution of phosphoric acid, calcine at 600°–700° C., thereafter add chromium by means of an alcoholic solution of chromium acetate and activate in the same manner as in the invention runs.

The polymerizations were carried out in the same manner as in Example I. The results are reported hereinbelow in Table II.

TABLE II

KETJEN L

| | Calcined* | | | | Calcined in Wrong Sequence** | | | |
|---|---|---|---|---|---|---|---|---|
| Run | P/Al | SA | Prod | HLMI | Control | P/Al | SA | Prod | HLMI |
| 11 | 0.1134 | 270 | 3252 | 6.7 | 9 | 0.1509 | 320 | 1528 | .18 |
| 12 | 0.1710 | 252 | 2641 | 45.6 | 10 | 0.1815 | 287 | 2054 | 1.2 |
| 13 | 0.2166 | 212 | 3225 | 91.2 | 11 | 0.2080 | 268 | 1980 | 4.2 |
| 14 | 0.2344 | 198 | 3319 | 111.4 | 12 | 0.2651 | 240 | 1862 | 16.1 |

*Sequence: Calcine; Impregnate with P/Cr; Activate.
**Sequence: Impregnate with P; Calcine; Impregnate with Cr; Activate.

This example demonstrates that the calcining must be carried out before the phosphating treatment since the control runs were given both heat treatments, the calcining and the activation step, but the calcining was carried out after the phosphorus treatment rather than before as in the invention runs.

A comparison of Invention Run 4 with Control Run 3 shows better than a twofold improvement in the productivity at the same P/Al ratio, a nominal 0.18. A comparison of Invention Run 8 with Control Run 7 shows a similar advantage for the invention. Finally, a comparison of Invention Run 12 with Control Run 10 shows a continuing advantage for the invention run with regard to productivity and melt index, even when the control is calcinated, thus proving the necessity to calcine before, not after the phosphating step. Other comparisons normalized for differences in P/Al ratio show the same unexpected result (Invention Run 5 versus Control Run 3 or 4, for instance). At low P/Al ratios, the advantage is even more dramatic, as the two and one-half fold improvement between Control Run 1 and Invention Run 1 shows.

EXAMPLE III

In this Run, a 23-gallon loop reactor with continuous addition of feed components and continuous removal of product was used.

Table III compares the bottle properties of ethylene homopolymers produced over supported chromium catalysts. Runs 1 and 2 utilized the invention support. Runs 3 and 4 utilized an optimized aluminum phosphate support and Run 5 utilized a conventional silica support.

TABLE III

| Run | 1 Invention[7] | 2 Invention[7] | 3 Aluminum Phosphate- | 4 Aluminum Phosphate | 5 Silica[8] |
|---|---|---|---|---|---|
| HLMI[1] | 17.7 | 19.7 | 21 | 30 | .35 MI |
| Density[2] | .964 | .964 | .963 | .961 | .954 |
| Productivity[3] | 1610 | 1480 | 3500 | 2550 | 4800 |
| Die Swell | 30% | 29% | 30% | 42% | 30% |
| Bottle ESCR[4] | 200 | 160 | 80 | 375 | 40 |
| Bottle Impact[5] | 6.5 | 7.1 | 9.3 | 12 | 11.5 |
| Top Load[6] | | | | | |
| @10 min. | 68 | 67 | 68 | 74 | 53 |
| @48 min. | 83 | 81 | 87 | 90 | 68 |

[1] ASTM D1238, Condition F.
[2] ASTM D1505; Conditioning Procedure A, ASTM D618; Molding Procedure C, ASTM D1928.
[3] g/g/75 minutes average residence time.
[4] Blown bottles filled with 10% Orvus K, 100% filled water at 140° F., hours to 50% failure.
[5] Blown bottle filled with water and dropped at RT, ft. at which failure occurs.
[6] Crush strength, lb-f (pounds of force) to collapse blown bottle.
[7] Ketjen grade L alumina precalcined and phosphated with tributylphosphate in heptane (P/Al = 0.16). After addition of the phosphate, the support was calcined at 500° C. and then impregnated with an alcoholic solution of chromium nitrate. The catalyst was activated at 649° C.
[8] Ethylene/hexene copolymer.

The results show the invention supports result in high density polymer with stress crack resistance superior to a lower density copolymer.

While this invention has been described in detail for the purpose of illustration, it is not to be construed as limited thereby but is intended to cover all changes and modifications within the spirit and scope thereof.

That which is claimed is:

1. A method of making a phosphated alumina comprising:
   (a) calcining alumina at a temperature of about 450° C. to about 900° C.; and
   (b) thereafter treating the thus calcined alumina with a phosphating agent selected from the group consisting of orthophosphoric acid, orthophosphates, POCl₃, PCl₃, phosphorous acid and NH₄H₂PO₃ to give a surface treatment wherein the atom ratio P/Al is in the range of about 0.2:1 to 2:1.

2. A method according to claim 1 wherein said orthophosphate is selected from monoammonium dihydrogen phosphate, diammonium hydrogen phosphate and metal phosphates, and wherein the thus phosphated alumina is activated in an oxidizing atmosphere at an elevated temperature.

3. A method according to claim 2 wherein after said alumina is activated an organochromium compound is anhydrously impregnated thereon.

4. A method according to claim 2 wherein a chromium compound is present during said activation to give an activated support chromium catalyst.

5. A method according to claim 4 wherein said supported chromium catalyst is combined with an organometal cocatalyst selected from aluminum alkyls and boron alkyls.

6. A method according to claim 5 wherein said alumina of (a), before said calcination, has a boehmite structure and is dehydroxylated to the gamma structure by said calcination.

7. A method according to claim 5 wherein said calcining is carried out in an air atmosphere at a temperature within the range of 600°–800° C. for a period of about 0.5 to about 10 hours.

8. A method according to claim 5 wherein said activating is carried out in air for one minute to 48 hours at a temperature within the range of 300°–800° C.

9. A method according to claim 5 wherein said phosphating agent is orthophosphoric acid and said orthophosphoric acid is used in an amount to give 0.01 to 0.5 mg phosphorous per square meter of surface area of said alumina.

10. A method according to claim 5 wherein said chromium compound is present in an amount sufficient to give 0.1 to 5 weight percent chromium based on the weight of said alumina after activation.

11. A method according to claim 5 wherein said phosphating agent is orthophosphoric acid and is incorporated in an amount within the range of 1 to 10 mole percent based on the total moles of said alumina.

12. A method according to claim 5 wherein said cocatalyst is selected from triethylborane, triphenylborane, and tri-n-butylborane, and wherein said cocatalyst is present in a sufficient amount to give about 1.5 to about 10 atoms of boron per atom of chromium.

13. A method according to claim 5 wherein said phosphating agent is an alcoholic solution of orthophosphoric acid and said phosphating is carried out at a temperature of 15° C. to 500° C. to 500° C. for a time of 1 minute to 2 hours.

14. A method according to claim 13 wherein said chromium compound is in said ortho phosphoric acid.

15. A method according to claim 14 wherein said chromium compound is present in an amount sufficient to give 0.1 to 5 weight percent chromium based on the weight of said alumina after activation.

16. A method according to claim 13 wherein said alumina has a boehmite structure and said calcining is carried out in air at a temperature within the range of 600°–800° C. for a time within the range of 0.5 to 10 hours, said phosphating agent is an alcoholic solution of said phosphating agent and said chromium compound and wherein said activating is carried out in air at a temperature within the range of 300°–600° C. for a time of 0.5 to 10 hours.

* * * * *